US012308186B2

(12) United States Patent
Desai et al.

(10) Patent No.: US 12,308,186 B2
(45) Date of Patent: May 20, 2025

(54) HIGH ENERGY SPRING DRIVE (71) Applicant: Hitachi Energy Ltd, Zürich (CH)

(72) Inventors: Dhairyshil Ramchandra Desai, Gujarat (IN); Chinmay Maheshbhai Dhaduk, Gujarat (IN); Satish Baburao Hajare, Maharashtra (IN)

(73) Assignee: Hitachi Energy Ltd, Zürich (CH)

( * ) Notice: Subject to any disclaimer, the term of this patent is extended or adjusted under 35 U.S.C. 154(b) by 0 days.

(21) Appl. No.: 18/725,237

(22) PCT Filed: Dec. 29, 2022

(86) PCT No.: PCT/EP2022/088029
§ 371 (c)(1),
(2) Date: Jun. 28, 2024

(87) PCT Pub. No.: WO2023/126490
PCT Pub. Date: Jul. 6, 2023

(65) Prior Publication Data
US 2024/0420900 A1 Dec. 19, 2024

(30) Foreign Application Priority Data
Dec. 31, 2021 (IN) .............................. 202121062227

(51) Int. Cl.
*H01H 3/26* (2006.01)
*H02K 7/00* (2006.01)
(Continued)

(52) U.S. Cl.
CPC .............. *H01H 3/26* (2013.01); *H02K 7/003* (2013.01); *H02K 7/118* (2013.01); *H02K 7/14* (2013.01)

(58) Field of Classification Search
CPC .......... H01H 3/26; H01H 3/30; H01H 3/3005; H01H 3/3015; H01H 2003/3063;
(Continued)

(56) References Cited

U.S. PATENT DOCUMENTS 3,898,409 A * 8/1975 Liebig ..................... H01H 3/30
200/400
5,504,289 A 4/1996 Smith et al.
(Continued)

FOREIGN PATENT DOCUMENTS

EP 2317530 A1 5/2011

OTHER PUBLICATIONS

International Search Report and Written Opinion of the International Searching Authority, PCT/EP2022/088029, mailed Mar. 17, 2023, 13 pages.

*Primary Examiner* — Lheiren Mae A Caroc
(74) *Attorney, Agent, or Firm* — Sage Patent Group (57) ABSTRACT A high energy spring drive to control a high voltage circuit breaker is described. The high energy spring drive includes a closing assembly positioned at a first end and an opening assembly positioned at a second end, a charging assembly positioned between the closing and opening assembly, and a transmission assembly. The closing and opening assembly control the closing and opening of circuit breaker. The charging assembly includes a worm wheel arrangement coupled to a motor to transfer torque to a motor shaft, to energize the closing assembly, a decoupling mechanism to decouple the worm wheel arrangement from the motor shaft on energization of the closing assembly, and a cam-follower mechanism. The transmission assembly actuated by the follower of the cam-follower mechanism is to electrically close a circuit breaker when the follower rotates in a first (Continued)

direction and electrically open the circuit breaker when the follower rotates a second direction.

14 Claims, 6 Drawing Sheets

(51) Int. Cl.
*H02K 7/118* (2006.01)
*H02K 7/14* (2006.01)

(58) Field of Classification Search
CPC .......... H02K 7/003; H02K 7/118; H02K 7/14; H02K 7/00
See application file for complete search history.

(56) References Cited

U.S. PATENT DOCUMENTS

| | | | |
|---|---|---|---|
| 5,938,008 A | | 8/1999 | Wehrli, III et al. |
| 5,973,278 A | * | 10/1999 | Wehrli, III ............... H01H 3/30 |
| | | | 200/400 |

* cited by examiner

Fig. 7

HIGH ENERGY SPRING DRIVE

CROSS REFERENCE TO RELATED APPLICATIONS

This application is a 35 U.S.C. § 371 national stage application of PCT International Application No. PCT/EP2022/088029 filed on Dec. 29, 2022, which in turn claims foreign priority to Indian patent application No. 202121062227, filed on Dec. 31, 2021, the disclosures and content of which are incorporated by reference herein in their entirety.

TECHNICAL FIELD

The present subject matter relates, in general, to a high energy spring drive. In particular, the present subject matter relates to a high energy spring drive for a high voltage circuit breaker.

BACKGROUND

Circuit breakers are protective switches commonly used in power systems to protect a selected electrical circuit from damage due to excess current and short circuits. The function of a circuit breaker is to connect or disconnect the selected electrical circuit from power supply. Circuit breakers include at least one pair of contacts that engage and disengage with each other. Once a circuit breaker is issued an opening command or a closing command, a relative motion between the pair of contacts occurs, causing disengagement or engagement of the contact of the circuit breaker. The energy required for the contact of the circuit breaker to engage (close) or disengage (open) from the time an opening or closing command is issued may be provided by a high energy drive.

High energy drives may be classified based on their operating mechanism into spring mechanism drives, motor-operated mechanism drives, hydraulic mechanism drives, magnetic drives, pneumatic mechanism drives, and the like. In spring mechanism drives, springs are provided to store the energy required to operate the contacts of the circuit breaker. The springs of the spring mechanism drive are compressed/energized to store the energy required to operate the contacts of the circuit breaker.

SUMMARY

Embodiments of the present disclosure provide a high energy spring drive unit for operating a circuit breaker to electrically open or close and a method for operating the high energy spring drive unit to electrically close or open a circuit breaker. Objectives of embodiments of the disclosure include providing a high energy spring drive which is modular, compact, and provides scalability in the output energy required, based on the application.

According to a first aspect, a high energy spring drive is provided. The high energy spring drive includes a closing assembly, an opening assembly, a charging assembly, and a transmission assembly. The closing assembly is positioned at a first end of the drive unit for controlling closing of a circuit breaker. Similarly, an opening assembly is positioned at a second end of the drive unit, substantially parallel to the closing assembly, for controlling opening of the circuit breaker. The charging assembly is positioned between the closing assembly and the opening assembly. The charging assembly includes a motor shaft coupled to the closing assembly and an output shaft coupled to the opening assembly. Further, the charging assembly includes a worm wheel arrangement, a decoupling mechanism, and a cam-follower mechanism. The worm wheel arrangement is coupled to the motor to transfer torque to the motor shaft and the closing assembly to energize the closing assembly. The decoupling mechanism is coupled to the worm wheel arrangement. The decoupling mechanism is to decouple the worm wheel arrangement from the motor shaft, to prevent transfer of torque from the worm wheel arrangement to the closing assembly on energization of the closing assembly. The cam-follower mechanism includes a cam that is mounted on the motor shaft and a follower mounted on the output shaft. The cam of the cam-follower mechanism is to cause the follower to rotate in a first direction during de-energization of the closing assembly to energize the opening assembly and the output shaft is to cause the follower to rotate in a second direction during de-energization of the opening assembly. The transmission assembly is actuated by the follower of the cam-follower mechanism. The transmission assembly is to electrically close a circuit breaker when the follower rotates in the first direction and electrically open the circuit breaker when the follower rotates in the second direction.

According to an implementation, the closing assembly includes one or more springs held between a first upper end fitting and a first lower end fitting. The one or more springs of the closing assembly are detachable and include a guiding element that is provided in a spring well of the one or more springs. The guiding element is connected between a first upper mechanical stopper and a first lower mechanical stopper of the closing assembly. Further, the guiding element includes a protruded portion at a centre of the guiding element. A closing connecting rod is connected between the first upper end fitting of the closing assembly at a distal end and a closing lever that is mounted on the motor shaft at a proximal end, where the closing connecting rod is to transmit motion from the motor shaft to the one or more springs of the closing assembly. Further, a pre-compression nut is provided on the first lower end fitting of the closing assembly, where the pre-compression nut is to rotate on application of an external force to increase or decrease an energy stored in the one or more springs of the closing assembly.

According to an implementation, the opening assembly includes one or more springs held between a second upper end fitting and a second lower end fitting. The one or more springs of the opening assembly are detachable and include a guiding element provided in a spring well of the one or more springs. The guiding element is connected between a second upper mechanical stopper and a second lower mechanical stopper of the opening assembly and the guiding element includes a protruded portion at a centre of the guiding element. Further, an opening connecting rod is connected between the second upper end fitting of the opening assembly at a distal end and an opening lever mounted on the output shaft at a proximal end to transmit motion from the output shaft to the one or more springs of the opening assembly. A pre-compression nut is provided on the second lower end fitting of the opening assembly, where the pre-compression nut is to rotate on application of an external force to increase or decrease an energy stored in the one or more springs of the opening assembly.

According to an implementation, the charging assembly comprises: a closing latch mechanism comprising a closing latch lever and a closing latch unit, wherein the closing latch lever is mounted on the motor shaft and is to latch onto the closing latch unit to lock the closing assembly in an energized state; and a closing damper coupled to the closing assembly to dissipate excess energy at an end of a closing operation.

According to an implementation, the charging assembly comprises: an opening latch mechanism comprising an opening latch lever and an opening latch unit, wherein the opening latch lever is mounted on the output shaft and is to latch onto the opening latch unit to lock the opening assembly in an energized state; and an opening damper coupled to the opening assembly to dissipate excess energy at an end of an opening operation.

According to an implementation, the decoupling mechanism comprises: an outer disc comprising an opening provided with a plurality of ridges along an inner periphery of the opening to receive the motor shaft; and an engagement mechanism free to rotate about an axis of the motor shaft coupled to the outer disc, wherein the engagement mechanism is to engage or disengage with the outer disc to couple or decouple the worm wheel arrangement from the motor shaft.

According to an implementation, the engagement mechanism comprises: an engagement disc including an aperture provided at a centre of the engagement disc to allow the motor shaft to pass through. The engagement disc includes one or more engagement slots provided along a circumference of the engagement disc to engage or disengage with one or more first plates and a second plate, where the one or more first plates and the second plate are mounted on the outer disc with one or more pins. Further, the one or more first plates and the second plate are free to rotate about an axis of the one or more pins to engage or disengage with the engagement disc at a first end.

According to an implementation, the second plate comprises a protrusion at a second end.

According to an implementation, the engagement mechanism comprises: one or more link arms to connect a second end of the one or more first plates and the second plate, where the one or more link arms are to transfer motion from one plate to another plate. Further, a tension spring is connected between a first pin of the one or more pins mounted on a first plate of the one or more first plates and the second plate to engage the one or more first plates and the second plate to the engagement disc.

According to an implementation, the charging assembly includes a decoupling lever provided on a first portion of a housing plate of the worm wheel arrangement projecting outwards substantially perpendicular to the housing plate, where the decoupling lever is to restrict a movement of the decoupling mechanism.

According to an implementation, the transmission assembly includes an output lever coupled to the follower of the cam-follower mechanism of the charging assembly at one end and to a transmission rod at another end, where the output lever is to transmit energy from the follower to the transmission rod, where the transmission rod is coupled to a mechanism housing lever to transmit energy to the mechanism housing lever to electrically close or open the circuit breaker.

According to an implementation, a length of the transmission rod is variable to vary an output characteristic of the drive unit.

According to an implementation, the charging assembly is positioned at a third end for ease of accessibility.

According to a second aspect, a method for operating a drive unit to electrically close or open a circuit breaker is provided. The drive unit includes a closing assembly positioned at a first end of the drive unit, an opening assembly positioned at a second end of the drive unit substantially parallel to the closing assembly, a charging assembly positioned between the closing assembly and the opening assembly, and a transmission assembly coupled to the charging assembly. The method includes receiving a trigger from a limit switch to energize the closing assembly, receiving a closing signal to electrically close the circuit breaker, and receiving an opening signal to electrically open the circuit breaker. In response to receiving the trigger, input power is supplied to the closing assembly through a worm wheel arrangement coupled to a motor to transfer torque to a motor shaft to energize the closing assembly. Further, the charging assembly is decoupled through a decoupling mechanism from the closing assembly to prevent transfer of torque from the worm wheel arrangement to the closing assembly on energization of the closing assembly. A closing latch lever is latched on to a closing latch unit of the charging assembly to lock the closing assembly in an energized state. In response to receiving a closing signal to electrically close the circuit breaker, the closing latch lever is released to rotate the motor shaft to de-energize the closing assembly. A cam of a cam-follower mechanism mounted on the motor shaft is rotated to cause a follower of the cam-follower mechanism mounted on an output shaft to rotate in a first direction during de-energization of the closing assembly. When the follower rotates in the first direction, energy from the closing assembly is transmitted to the transmission assembly coupled to the follower to electrically close the circuit breaker. Simultaneously, energy is transmitted through the follower to the output shaft coupled to the opening assembly to energize the opening assembly. On energizing the opening assembly, an opening latch lever mounted on the output shaft may be latched on to an opening latch unit of the charging assembly to lock the opening assembly in an energized state. Further, in response to receiving an opening signal to electrically open the circuit breaker, the opening latch lever is released to cause the output shaft to cause the follower of the cam-follower mechanism to rotate in a second direction during de-energization of the opening assembly. When the follower rotates in the second direction, energy from the opening assembly is transmitted to the transmission assembly coupled to the follower to electrically close the circuit breaker.

BRIEF DESCRIPTION OF DRAWINGS

The features, aspects, and advantages of the present subject matter will be better understood with regard to the following description and accompanying figures. The use of the same reference number in different figures indicates similar or identical features and components.

DETAILED DESCRIPTION

The present subject matter relates to a high energy spring drive unit, alternatively referred to as a drive unit, to control a high voltage circuit breaker. Conventionally, in electrical switchgear, such as, Gas Insulated Switchgear (GIS), hydro-mechanical (HMB) drives are utilized in order to operate the contacts of the circuit breaker, herein referred to as circuit breaker. In general, hydro-mechanical drives include disc springs and incompressible oil. The disc springs are to store the energy required to operate the circuit breaker and the incompressible oil is for transmission of energy from the HMB drive to the circuit breaker. Such drives have a complex design and incur high installation costs. Further, they do not demonstrate modularity or scalability in their output energy.

In order to alleviate problems associated with the hydro-mechanical drives associated with operating high voltage circuit breakers, the present subject matter provides a robust high energy spring drive unit. The high energy spring drive unit is provided with one or more springs in the closing assembly and opening assembly. The springs of the closing and opening assembly store the energy required to operate the circuit breaker. The one or more springs of the opening and closing assembly can be oriented either vertically or horizontally to ensure adaptability and modularity of the drive unit. The springs may be oriented based on the high voltage circuit breaker to be operated. Additionally, the one or more springs of the closing assembly and the opening assembly are detachable. The number of springs may be increased or decreased to achieve the required output energy, which ensures scalability in the output energy. Further, the positioning of the one or more springs of the closing assembly, the opening assembly, and the charging assembly in the drive unit ensures ease of accessibility for maintenance and repair, which in turn decreases the costs incurred for maintenance and installation.

The present subject matter therefore provides a high energy spring drive unit including a closing assembly, an opening assembly, a charging assembly, and a transmission assembly. The closing assembly is positioned at a first end of the drive unit for controlling closing of a circuit breaker. Similarly, an opening assembly is positioned at a second end of the drive unit, for controlling opening of the circuit breaker. The opening assembly is substantially parallel to the closing assembly. The charging assembly is positioned between the closing assembly and the opening assembly. The charging assembly includes a motor shaft coupled to the closing assembly and an output shaft coupled to the opening assembly. Further, the charging assembly includes a worm wheel arrangement, a decoupling mechanism, and a cam-follower mechanism. The worm wheel arrangement is coupled to the motor to transfer torque from the motor to the motor shaft and the closing assembly, in order to energize the closing assembly. The decoupling mechanism is coupled to the worm wheel arrangement. The decoupling mechanism is to decouple the worm wheel arrangement from the motor shaft to prevent transfer of torque from the worm wheel arrangement to the closing assembly, on energization of the closing assembly. The cam-follower mechanism includes a cam that is mounted on the motor shaft and a follower mounted on the output shaft. The cam of the cam-follower mechanism is to cause the follower to rotate in a first direction during de-energization of the closing assembly to energize the opening assembly and the output shaft is to cause the follower to rotate in a second direction during de-energization of the opening assembly. The transmission assembly is actuated by the follower of the cam-follower mechanism. The transmission assembly is to electrically close a circuit breaker when the follower rotates in the first direction and electrically open the circuit breaker when the follower rotates in the second direction. As used herein, the phrase electrically close or electrically open refers to the position of the contact, for example, opened/disengaged or closed/engaged.

The closing and opening assembly of the high energy spring drive unit include one or more springs that are detachable which facilitates scaling of the output energy of the drive unit. The output energy may be varied by increasing or decreasing the number of springs in the closing and opening assembly. Further, each spring well of the one or more springs of the closing and opening assembly are provided with a guiding element that maintain the one or more springs in their intended positions, allowing the drive unit to be oriented along either a vertical axis or a horizontal axis. Additionally, both the closing assembly and the opening assembly are provided with a pre-compression nut which rotates on application of an external force to increase or decrease an energy stored in the one or more springs.

The present subject matter therefore provides a compact and modular high energy spring drive unit, where the one or more springs of the drive unit may be varied based on the output energy requirement.

The above and other features, aspects, and advantages of the subject matter will be better explained with regard to the following description and accompanying figures. Wherever possible, the same reference numbers are used in the drawings and the following description to refer to the same or similar parts. While several examples are described, modifications, adaptations, and other implementations are possible.

Figure 1A:
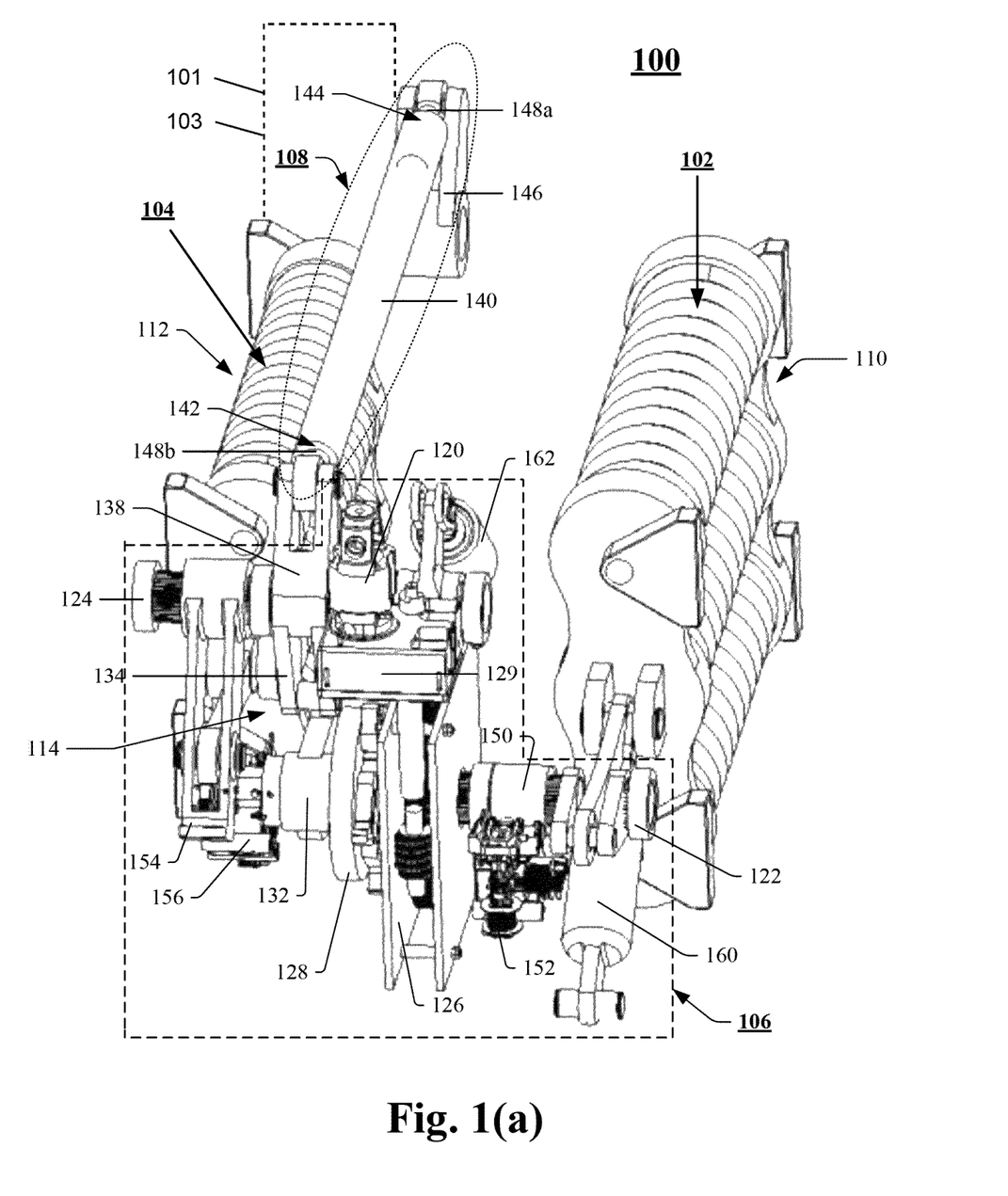
FIG. 1(a) illustrates a first example perspective view of a high energy spring drive unit, in accordance with an embodiment of the present subject matter.

FIG. 1(a) illustrates a first example perspective view of a high energy spring drive unit 100, in accordance with an embodiment of the present subject matter. The high energy spring drive unit 100, alternatively referred to as drive unit 100, may be connected in an electrical network (not shown in the figure) for controlling electrical switchgear, such as, a circuit breaker 101 for medium and high voltages. It will be understood that the electrical network may include a plurality of additional components or devices for monitoring, sensing, and controlling various parameters that may be associated with the network but are not shown for brevity. For example, components such as circuit breakers, sensors, current transformers, voltage transformers, loads connected to the transmission lines, shunt reactors, intelligent electronic devices IEDs, protective relays, and the like may be connected to the network. In one example, the drive unit 100 may receive an opening command or a closing command to open or close the circuit breaker, respectively. In one example the opening command or the closing command may be issued by any device (not shown in the figure), such as an intelligent electronic device (IED). In other examples, the opening command or the closing command may be issued by any computing device, such as a server, a desktop device, a laptop, etc., which may receive the measurements from an IED.

Figure 7:
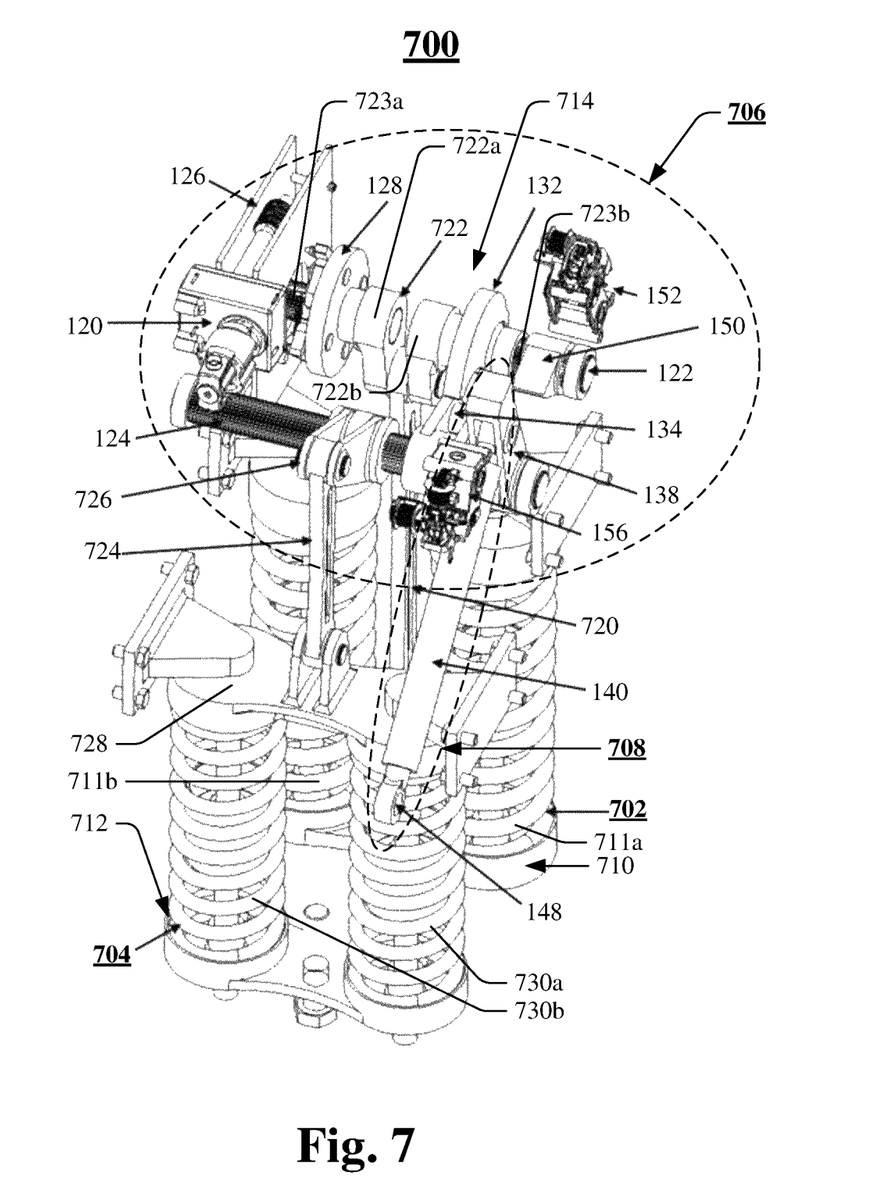
FIG. 7 illustrates a second example perspective view of a high energy spring drive unit, in accordance with an embodiment of the present subject matter.

In one example, the drive unit 100 includes a closing assembly 102, an opening assembly 104, a charging assembly 106, and a transmission assembly 108. The closing assembly 102 of the drive unit 100 may be positioned at a first end 110 of the drive unit 100. Similarly, the opening assembly 104 of the drive unit 100 may be positioned at a second end 112 of the drive unit 100. The closing assembly 102 may be oriented along a first axis and the opening assembly 104 may be positioned substantially parallel to the closing assembly 102. In one example, the first axis may be a horizontal axis. In another example, the first axis may be a vertical axis as depicted in FIG. 7.

The closing assembly 102 may provide a closing energy to control a closing operation of the circuit breaker. Similarly, the opening assembly 104 may provide an opening energy to control the opening operation of the circuit breaker. The closing assembly 102 and the opening assembly 104 may be provided with one or more springs to store energy required to electrically close or open the circuit breaker. The one or more springs of the drive unit 100 may be detachable. The number of springs may be varied based on the output requirements of the drive unit 100. The closing assembly 102 and the opening assembly 104 of the drive unit 100 are discussed in detail with reference to FIG. 2 and FIG. 3 respectively.

The charging assembly 106 may be utilized to charge, alternatively referred to as energize, the one or more springs of the closing assembly 102. In one example, the charging assembly 106 may be disposed at a third end 114 in between the closing assembly 102 and the opening assembly 104. In one example, the third end 114 may be a front end of the drive unit 100, such that the front end of the drive unit 100 may be easily accessible for maintenance or repair. The charging assembly 106 of the drive unit 100 includes a motor 120, a motor shaft 122, an output shaft 124, a worm wheel arrangement 126, a decoupling mechanism 128, and a cam follower mechanism.

The motor shaft 122 of the charging assembly 106 may be coupled to the closing assembly 102 and the output shaft 124 may be coupled to the opening assembly 104. The motor 120 of the charging assembly 106 may be provided to supply input power to the worm wheel arrangement 126. In order to increase the output torque of the motor 120, a gear box 129 may be coupled to the worm wheel arrangement 126. The gear box 129 may be positioned in between the motor 120 and the worm wheel arrangement 126. In one example, the worm wheel arrangement 126 may be mounted on a chassis (not shown in the figure) of the drive unit 100. In one example, the worm wheel arrangement 126 may be coupled to the motor shaft 122. The worm wheel arrangement 126 may be provided to transfer torque from the motor 120 to the motor shaft 122. The motor shaft 122 in turn, may transfer torque to the closing assembly 102 to energize the one or more springs of the closing assembly 102.

In one example, the decoupling mechanism 128 may be provided to couple or decouple the worm wheel arrangement 126 from the motor shaft 122. The worm wheel arrangement 126 may be coupled to the motor shaft 122 to energize the one or more springs of the closing assembly 102 and may be decoupled from the motor shaft 122 when the one or more springs of the closing assembly 102 are energized. The decoupling mechanism is to prevent the transfer of torque from the worm wheel arrangement 126 to the closing assembly 102 on energization of the closing assembly 102, i.e. when the one or more springs are fully energized/compressed. The decoupling mechanism 128 of the drive unit 100 includes an engagement mechanism to couple or decouple the worm wheel arrangement 126 from the motor shaft 122, discussed in detailed with reference to FIG. 4.

Figure 1B:
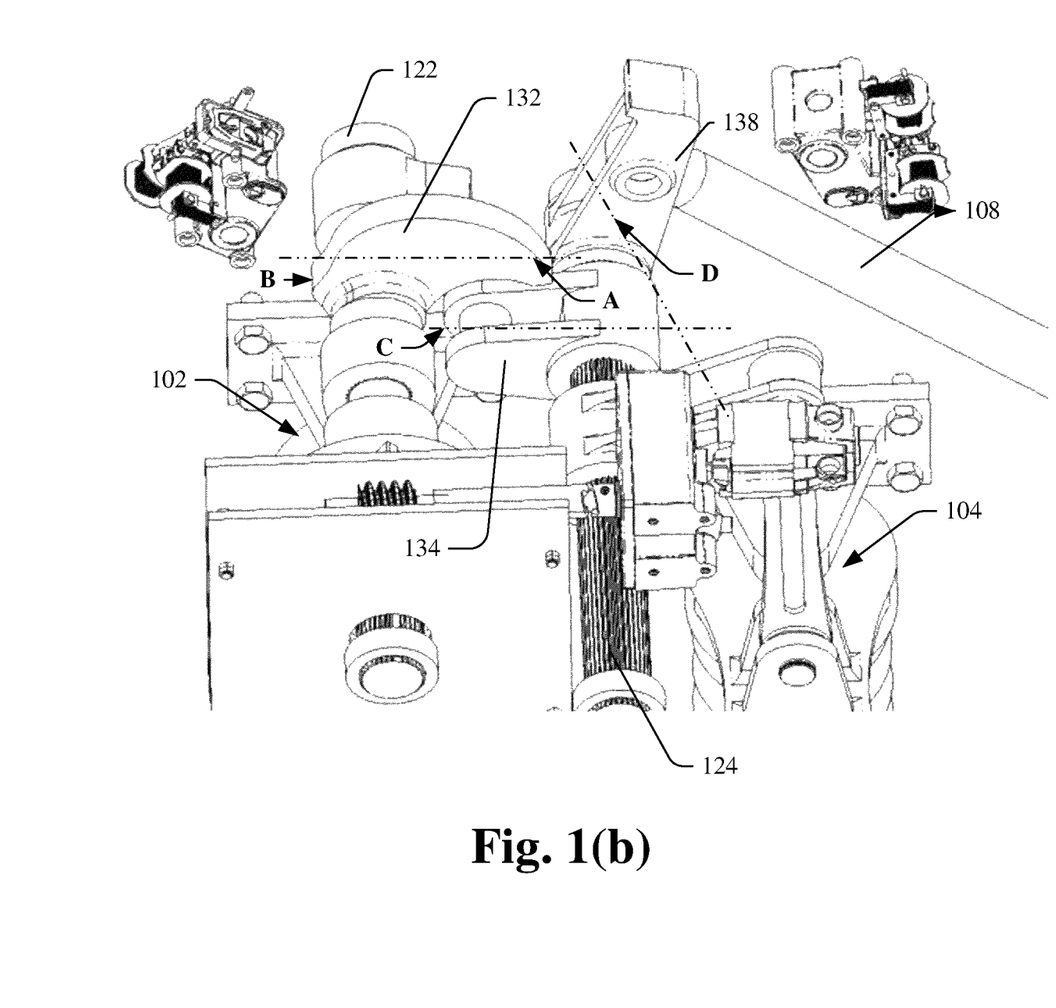
FIG. 1(b) illustrates a perspective view of a cam-follower mechanism, in accordance with an embodiment of the present subject matter.

In one example, the cam-follower mechanism of the charging assembly 106 may include a cam 132 and a follower 134. The cam 132 may be mounted on the motor shaft 122 and the follower 134 may be mounted on the output shaft 124. In one example, the cam-follower mechanism may be designed such that motion and torque from the cam 132 may be transmitted to the follower 134, but not vice-versa, explained in detail with reference to FIG. **1(*b*). The follower 134 may be coupled to an output lever 138 of the transmission assembly 108 to transmit motion and torque from the closing assembly 102 or the opening assembly 104 to a mechanism housing unit 103** of the circuit breaker.

In one example, the transmission assembly 108 of the drive unit 100 may include a transmission rod 140. The transmission rod 140 may be connected to the output lever 138 at one end 142 and the mechanism housing lever 146 of the mechanism housing unit 103 of the circuit breaker 101 at another end 144. The transmission rod 140 may be coupled to the output lever 138 and the mechanism housing lever 146 with the help of two fasteners. In one example, the fasteners may be two eye bolts 148*a* and 148*b*. In another example, fasteners such as screws, bolts, studs, or the like may be used to couple the transmission rod 140.

In one example, the transmission rod 140 of the transmission assembly 108 may be adjustable. A length of the transmission rod 140 may be varied, to vary an output characteristic of the drive unit 100. For example, output characteristics of the drive unit 100 include contact distance, stroke length, closing and opening velocity, closing and opening time, travel curve, and the like. The length of the transmission rod 140 may be varied with the help of the two eye bolts 148*a*, 148*b*. In one example, the transmission rod 140 may be twisted about its longitudinal axis in a first direction to allow the transmission rod 140 to elongate longitudinally to vary an output characteristic of the drive unit 100. In another example, the transmission rod 140 may be twisted about its longitudinal axis in a second direction to allow the transmission rod 140 to shorten longitudinally to vary an output characteristic of the drive unit 100. In one example the first direction may be a clockwise rotation and the second direction may be an anticlockwise rotation.

Additionally, the charging assembly 106 of the drive unit 100 may include a latching mechanism and a damper mechanism. The latching mechanism of the drive unit 100 may include a closing latch mechanism and an opening latch mechanism. The closing latch mechanism includes a closing latch lever 150 and a closing latch unit 152. The closing latch lever 150 may be mounted on the motor shaft 122. The closing latch lever 150 is to latch onto the closing latch unit 152 to lock the one or more springs of the closing assembly 102 in an energized state. Similarly, the opening latch mechanism includes an opening latch lever 154 and an opening latch unit 156. The opening latch lever 154 may be mounted on the output shaft 124. The opening latch lever 154 is to latch onto the opening latch unit 156 to lock the one or more springs of the opening assembly 104 in an energized state.

Further, the damper mechanism of the charging assembly 106 may include a closing damper 160 and an opening damper 162. In one example, the closing damper 160 may be coupled to the closing assembly 102 through a closing damper lever (not shown in the figure). The closing damper 160 may be provided in order to dissipate excess energy at an end of a closing operation. Similarly, the opening damper 162 may be coupled to the opening assembly 104 through an opening damper lever 164. The opening damper 162 may be provided in order to dissipate excess energy at an end of an opening operation.

FIG. 1(b) illustrates a perspective view of a cam-follower mechanism, in accordance with an embodiment of the present subject matter. As shown in FIG. 1(b), to transfer motion and torque from the closing assembly 102 to the opening assembly 104 and the transmission assembly 108, the cam 132 mounted on the motor shaft 122 may rotate to hit the follower 134 mounted on the output shaft 124. In one example, the cam 132 may rotate from position A to position B during a charging operation of the drive unit 100. Further, the cam 132 may rotate from position B to position A during a discharging operation of the closing assembly 102. In one example, the cam 132 may rotate 180 degrees to reach position B from position A and rotate 180 degrees from position B to reach position A, in order to complete one revolution of 360 degrees. This movement of the cam 132 from position A to position B, and back to position A, ensures that the cam 132 comes in contact with the follower 134 only when the cam 132 rotates from position B to position A. The cam 132 may come in contact with the follower 134 to displace the follower from position C to position D. In one example, the follower 134 may be displaced by 60 degrees from position C to position D. Once the cam 132 causes the follower 134 to be displaced from position C to position D, the cam 132 may rotate further to return to position A. Therefore, motion and torque from the cam 132 may be transmitted to the follower 134, but not vice-versa. The follower 134 may be coupled to the output lever 138 of the transmission assembly 108 to transmit motion and torque from the closing assembly 102 or the opening assembly 104 to the mechanism housing of the circuit breaker.

Figure 2:
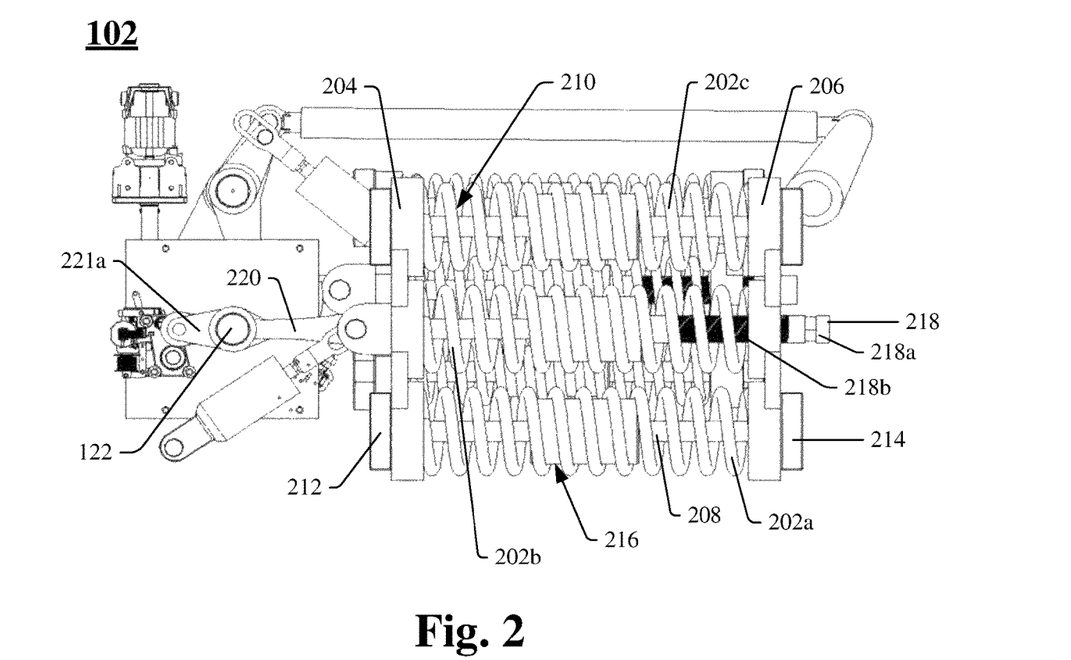
FIG. 2 illustrates a perspective view of a closing assembly, in accordance with an embodiment of the present subject matter.

FIG. 2 illustrates a perspective view of a closing assembly 102, in accordance with an embodiment of the present subject matter. The closing assembly 102 of the drive unit 100 includes one or more springs 202a, 202b, and 202c, alternatively referred to as closing springs 202. The one or more springs may be spaced apart and positioned parallelly adjacent to one another, oriented along a first axis. In one example, the first axis may be a horizontal axis. In another example, the first axis may be a vertical axis (not shown in the figure).

In one example, the one or more springs 202a, 202b, and 202c of the closing assembly 102 may be detachable. The number of springs in the closing assembly may be varied based on the output energy requirement of the drive unit. For example, for an output energy requirement of 7 kJ, the closing assembly 102 may include three closing springs (202a, 202b, and 202c). However, for an output energy requirement of 4 kJ, the middle spring 202b of the closing assembly 102 may be removed, and the closing assembly 102 may include two closing springs (202a and 202c). As it would be understood, similar adjustments to the number of springs may be made in the opening assembly 104 of the drive unit 100.

In one example, the one or more springs 202a, 202b, and 202c may be held between a first upper end fitting 204 and a first lower end fitting 206. The first upper end fitting 204 and the first lower end fitting 206 are to hold the closing springs 202 in their intended positions. Further, each of the closing springs 202a, 202b, and 202c may be provided with a guiding element 208. The guiding element 208 may be provided in a spring well 210 of each of the closing springs 202a, 202b, and 202c. In one example, the guiding element 208 may be connected between a first upper mechanical stopper 212 and a first lower mechanical stopper 214 of the closing assembly 102. The first upper mechanical stopper 212 and the first lower mechanical stopper 214 may be attached to the first upper end fitting 204 and the first lower end fitting 206, respectively. Further, each guiding element 208 may be provided with a protruded portion 216 at a centre of the guiding element 208. The protruded portion 216 of the guiding element 208 is to prevent the one or more springs 202a, 202b, and 202c of the closing assembly 102 from gliding or buckling into one another.

Additionally, a pre-compression nut 218 may be provided on the first lower end fitting 206 of the closing assembly 102. The first lower end fitting 206 may include a threaded slot to receive the pre-compression nut 218. The pre-compression nut 218 includes a head 218a and an engaging surface 218b. In one example, the engaging surface 218b may be a threaded surface. The engaging surface 218b of the pre-compression nut 218 may be passed through the threaded slot of the first lower end fitting 206 to couple a first end of the guiding element 208 provided in the spring well of the 210 of the middle spring 202b.

In one example, the head 218a of the pre-compression nut 218 may be rotated on application of an external force to increase or decrease an energy stored in the one or more springs 202a, 202b, and 202c of the closing assembly 102. As the pre-compression nut 218 is coupled to the guiding element 208, passing through the first lower end fitting 206, rotation of the head 218a of pre-compression nut 218 causes simultaneous movement of the one or more springs 202 of the closing assembly 102. In one example, the head 218a of the pre-compression nut 218 may be rotated in a first direction to increase the energy stored in the one or more springs 202a, 202b, and 202c, on charging the closing assembly 102. In another example, the head 218a of the pre-compression nut 218 may be rotated in a second direction to decrease the energy stored in the one or more springs 202a, 202b, and 202c, on charging the closing assembly 102. In one example, the first direction may be a clockwise direction and the second direction may be an anticlockwise direction.

Further, the closing assembly 102 includes a closing connecting rod 220 that is coupled to the charging assembly 106 of the drive unit 100, through a closing lever. In one example, the closing lever may include a first lever 221a and a second lever (not shown in the figure), between which the closing connecting rod 220 may be connected. In one example, the closing connecting rod 220 may be connected to the first upper end fitting 204 of the closing assembly 102 at a distal end and to the closing lever mounted on the motor shaft at a proximal end. In one example, the closing lever may be mounted on the motor shaft 122 of the charging assembly 106. The closing connecting rod 220 is to transmit motion and torque from the motor shaft 122 to the one or more springs 202a, 202b, and 202c and vice-versa, while energizing or de-energizing the closing assembly, respectively.

Figure 3:
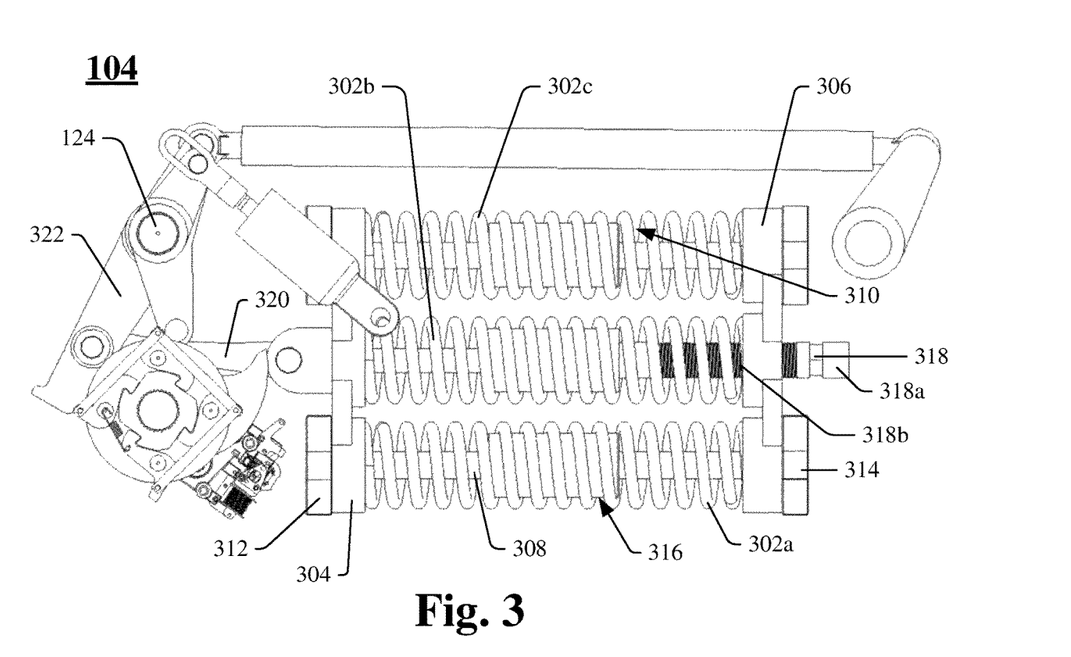
FIG. 3 illustrates a perspective view of an opening assembly, in accordance with an embodiment of the present subject matter.

FIG. 3 illustrates a perspective view of an opening assembly 104, in accordance with an embodiment of the present subject matter. The opening assembly 104 of the drive unit 100 includes one or more springs 302a, 302b, and 302c. The one or more springs 302a, 302b, and 302c of the opening assembly 104, alternatively referred to as opening springs 302, may be spaced apart and positioned parallelly adjacent to one another. The one or more springs 302*a*, 302*b*, and 302*c* of the opening assembly 104 may be oriented along a first axis. In one example, the first axis may be a horizontal axis. In another example, the first axis may be a vertical axis (not shown in the figure). In one example, the one or more springs 302*a*, 302*b*, and 302*c* may be detachable. The number of springs in the opening assembly 104 may be varied based on the output energy requirement of the drive unit 100.

In one example, the opening springs 302 may be held between a second upper end fitting 304 and a second lower end fitting 306 of the opening assembly 104. The second upper end fitting 304 and a second lower end fitting 306 are to hold the one or more springs 302*a*, 302*b*, and 302*c* in their intended positions. Further, each of the one or more springs 302*a*, 302*b*, and 302*c* may be provided with a guiding element 308. The guiding element 308 may be provided in a spring well 310 of each of the one or more springs 302*a*, 302*b*, and 302*c*. In one example, the guiding element 308 may be connected between a second upper mechanical stopper 312 and a second lower mechanical stopper 314. Each guiding element 308 may be provided with a protruded portion 316 at a centre of the guiding element 308. The protruded portion 316 of the guiding element 308 is to maintain the one or more springs 302*a*, 302*b*, and 302*c* in their position and prevent them from gliding or buckling into one another.

Additionally, a pre-compression nut 318 may be provided on the second lower end fitting 306. The second lower end fitting 306 may include a threaded slot (not shown in the figure) to receive the pre-compression nut 318. The pre-compression nut 318 includes a head 318*a* and an engaging surface 318*b*. In one example, the engaging surface 318*b* may be a threaded surface. The engaging surface 318*b* of the pre-compression nut 318 may be passed through the threaded slot of the second lower end fitting 306, to be coupled to a first end of the guiding element 308 of the middle spring 302*b*.

In one example, the head 318*a* of the pre-compression nut 318 may be rotated on application of an external force to increase or decrease an energy stored in the one or more springs 302*a*, 302*b*, and 302*c* of the opening assembly 104. As the pre-compression nut 318 passes through the second lower end fitting 306, rotation of the head 318*a* of pre-compression nut 318 causes simultaneous movement of the one or more springs 302 of the opening assembly 104. In one example, the head 318*a* of the pre-compression nut 318 may be rotated in a first direction to increase the energy stored in the one or more springs 302*a*, 302*b*, and 302*c*, on charging the opening assembly 104. In another example, the head 318*a* of the pre-compression nut 318 may be rotated in a second direction to decrease the energy stored in the one or more springs 302*a*, 302*b*, and 302*c*, on charging the opening assembly 104. In one example, the first direction may be a clockwise direction and the second direction may be an anticlockwise direction.

Further, the opening assembly 104 includes an opening connecting rod 320 that may be coupled to the output shaft 124 of the charging assembly 106. The opening connecting rod 320 may be coupled through an opening lever 322. In one example, the opening connecting rod 320 may be connected between the opening lever 322 mounted on the output shaft 124 at a proximal end and the second upper end fitting 304 of the opening assembly 104 at a distal end. The opening connecting rod 320 is to transmit motion and torque from the output shaft 124 to the one or more springs 302*a*, 302*b*, and 302*c* of the opening assembly 104 and vice-versa, while energizing and de-energizing the opening assembly 104, respectively.

Figure 4:
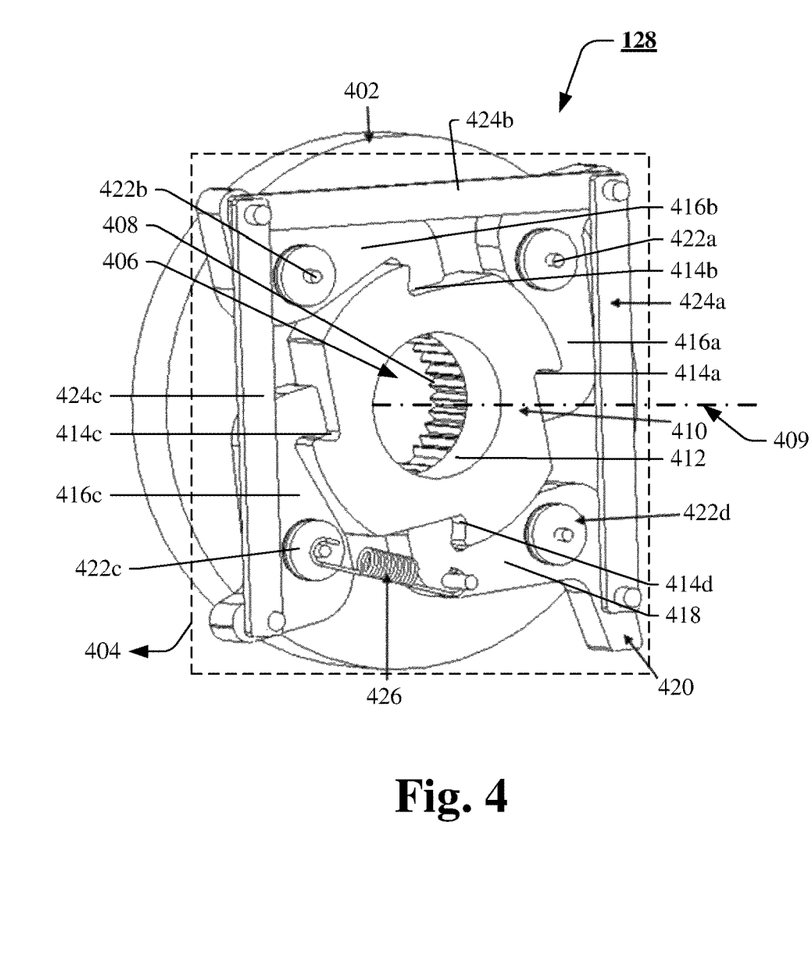
FIG. 4 illustrates an example of a decoupling mechanism, in accordance with an embodiment of the present subject matter.

FIG. 4 illustrates an example of a decoupling mechanism 128, in accordance with an embodiment of the present subject matter. In one example, the decoupling mechanism 128 may be provided with an outer disc 402 and an engagement mechanism 404. In one example, the outer disc 402 may include an opening 406 to allow the motor shaft 122 (not shown in the figure) to pass through. The opening 406 may be provided with multiple ridges 408 along an inner periphery of the opening 406 to receive the motor shaft 122. In one example, the outer disc 402 may be rigidly mounted on the motor shaft 122. Further, the outer disc 402 may be operatively coupled or decoupled to the engagement mechanism 404.

In one example, the engagement mechanism 404 may be free to rotate about an axis of the motor shaft 122. The engagement mechanism 404 may engage or disengage with the outer disc 402. In one example, the engagement mechanism 404 may partially rotate in a first direction about an axis 409 of the motor shaft 122 to engage with the outer disc 402, in order to couple the worm wheel arrangement 126 to the motor shaft 122. In another example, the engagement mechanism 404 may partially rotate in a second direction about the axis 409 of the motor shaft 122 to disengage with the outer disc 402, in order to decouple the worm wheel arrangement 126 from the motor shaft 122.

The engagement mechanism 404 of the decoupling mechanism 128 may include an engagement disc 410. In one example, the engagement disc 410 may be annular in structure. The engagement disc 410 may include an aperture 412 provided at a centre of the engagement disc 410 to allow the motor shaft 122 to pass through. Further, one or more engagement slots 414 may be provided along a circumference of the engagement disc 410. In one example, a first engagement slot 414*a*, a second engagement slot 414*b*, a third engagement slot 414*c*, and a fourth engagement slot 414*d*, collectively referred to as engagement slots 414, may be provided.

Additionally, the engagement mechanism 404 may be provided with one or more first plates 416 and a second plate 418. The one or more first plates 416 and the second plate 418, collectively and alternatively referred to as engagement plates, may be provided to engage or disengage with the one or more engagement slots 414. The engagement plates of the engagement mechanism 404 may engage or disengage with the one or more engagement slots 414 to couple or decouple the motor shaft 122 from the worm wheel arrangement 126.

In one example, the one or more first plates 416 may be a first engagement plate 416*a*, a second engagement plate 416*b*, and a third engagement plate 416*c* and the second plate 418 may be alternatively referred to as a fourth engagement plate 418. In one example, the one or more first plates 416, i.e., the first engagement plate 416*a*, the second engagement plate 416*b*, and the third engagement plate 416*c* may be of a similar shape and size. The second plate 418, i.e., the fourth engagement plate 418 may be of a different shape and size when compared to the one or more first plates 416. The one or more first plates 416 and the second plate 418 may include a first end and a second end. In one example, the second engagement plate 418 may be provided with a protrusion 420 at the second end. In one example, the one or more first plates 416 and the second plate 418 may be an S-shaped plate.

Each of the engagement plates 416, 418 may be mounted on the outer disc 402 with one or more pins. The engagement plates 416, 418 may be mounted such that they are free to rotate about an axis of the one or more pins to engage or disengage with the engagement disc 410 at a first end. The first end of the one or more first plates 416 and the second plate 418 may fit into the engagement slots 414 provided along the circumference of the engagement disc 410. In one example, the first engagement plate 416*a* may be mounted on a first portion of the outer disc 402 with a first pin 422*a*. The first engagement plate 416*a* may be free to rotate about an axis of the first pin 422*a* to engage or disengage with the first engagement slot 414*a* at the first end. Similarly, the second engagement plate 416*b* may be mounted on a second portion of the outer disc 402 with a second pin 422*b*, the third engagement plate 416*c* may be mounted at a third portion of the outer disc 402 with a third pin 422*c*, and the fourth engagement plate 418 may be mounted on a fourth portion of the outer disc 402 with a fourth pin 422*d*. The second engagement plate 416*b*, the third engagement plate 416*c*, and the fourth engagement plate 418 may be free to rotate about an axis of the second pin 422*b*, the third pin 422*c*, and the fourth pin 422*d*, respectively, to engage or disengage with the second engagement slot 414*b*, the third engagement slot 414*c*, and the fourth engagement slot 414*d*, respectively.

In one example, one or more link arms 424 may be provided to connect a second end of the one or more first plates 416 and the second plate 418. The one or more link arms 424 may be provided to transfer motion from one engagement plate to another engagement plate. In this example, as shown in FIG. 4, three link arms are provided to connect the engagement plates 416, 418. In one example, a first link arm 424*a* may be provided to connect a second end of the first engagement plate 416*a* and a second end of the fourth engagement plate 418. Similarly, a second link arm 424*b* may be provided to connect a second end of the first engagement plate 416*a* and a second end of the second engagement plate 416*b*, and a third link arm 424*c* may be provided to connect a second end of the second engagement plate 416*b* and a second end of the third engagement plate 416*c*.

In addition to one or more link arms 424, a tension spring 426 may be provided. In one example, the tension spring 426 may be connected between the third pin 422*c* of the one or more pins 422 mounted on the third plate 416*c* of the one or more first plates 416 and the second plate 418. The tension spring 426 may be provided to engage the one or more first plates 416 and the second plate 418 to the engagement disc 410 in the absence of an external force.

Figure 5:
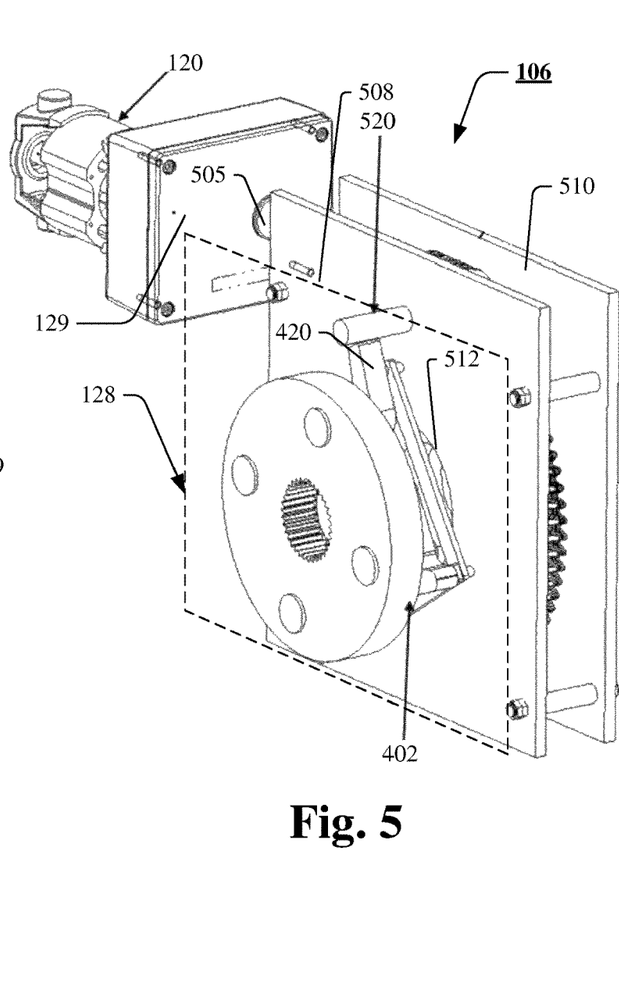
FIG. 5 illustrates a perspective view of a part of a charging assembly, in accordance with an embodiment of the present subject matter.

FIG. 5 illustrates a perspective view of a part of the charging assembly 106, in accordance with an embodiment of the present subject matter. The motor 120 of the charging assembly 106 may be positioned at the top end of the drive unit 100. In one example, the motor 120 may be connected to the worm wheel arrangement 126 through the gear box 129. The gear box 129 and the worm wheel arrangement 126 may be provided to increase the output torque of the motor 120. In one example, the gear box 129 may include spur gear pairs. The gear box 129 and the worm gear of the worm wheel arrangement 126 may be coupled through a coupling pipe 505.

In one example, the worm wheel arrangement 126 may be provided with a first housing plate 508 and a second housing plate 510. The first housing plate 508 and the second housing plate 510 may be fastened with the help of fasteners such as screws, bolts, studs, and the like. In one example, the first housing plate 508 may be provided with a first opening 512. Similarly, the second housing plate 510 may be provided with a second opening (not shown in the figure). The first opening 512 and the second opening may be provided to allow the motor shaft 122 to pass through. In one example, the worm wheel and the worm gear of the worm wheel arrangement 126 may be disposed in between the first housing plate 508 and the second housing plate 510. In one example, the first opening 512, the second opening, and an aperture of the worm gear (not shown in the figure) may be co-axially aligned, in order to mount the worm wheel arrangement 126 on the motor shaft 122 of the drive unit 100.

Further, the decoupling mechanism 128 of the charging assembly 106 may be mounted adjacent to the first housing plate 508, such that the outer disc 402 of the decoupling mechanism faces away from the first housing plate 508. In one example, the first housing plate 508 may be provided with a decoupling lever 520. The decoupling lever 520 may be provided on a first portion of the first housing plate 508 projecting outwards, substantially perpendicular to the first housing plate 508. The decoupling lever 520 may be provided to restrict a movement of the decoupling mechanism 128. In operation, when the engagement mechanism of the decoupling mechanism 128 rotates about an axis of the motor shaft 122, the decoupling lever 520 is to restrict a complete revolution of the engagement mechanism, in particular, the decoupling lever 520 is to restrict the protrusion 420 of the second plate 418 of the engagement mechanism as discussed with reference to FIG. 4.

Figure 6A:
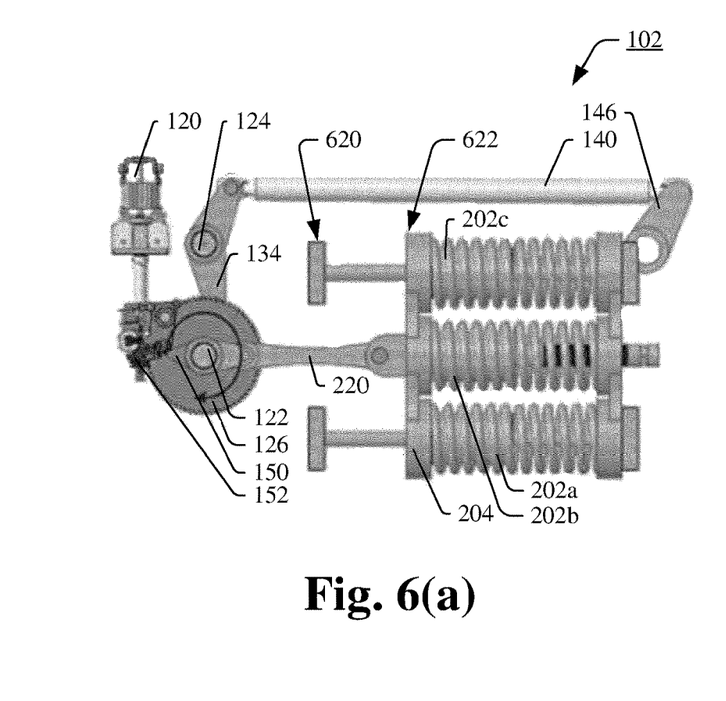
FIG. 6(a) illustrates a charging operation of the closing assembly, in accordance with an embodiment of the present subject matter.

FIG. 6(*a*) illustrates a charging operation of the closing assembly 102, in accordance with an embodiment of the present subject matter. The working mechanism of the drive unit 100 may include a charging operation, a closing operation and an opening operation. The closing and opening operations are to control the closing and opening of the circuit breaker, respectively. For the drive unit 100 to control the closing and opening operation of the circuit breaker, the one or more springs of the closing assembly and the opening assembly may be charged, alternatively referred to as energized or compressed, to store energy. The energy stored may be required to move the moving contact of the circuit breaker in order to electrically close or electrically open the circuit breaker.

In operation, during the charging operation, the motor shaft 122 rotates for 180 degrees from a first position to a second position along the first direction to energize or charge the one or more springs of the closing assembly 102. In one example, the first direction may be a clockwise direction. In order to energize the closing assembly 102, a limit switch (not shown in the figure) may issue a trigger signal to the motor 120. In response to receiving the trigger signal from the limit switch, the motor 120 of the charging assembly 106 may supply input power to the one or more springs of the closing assembly 102. The input power to the one or more springs may be supplied through the worm wheel arrangement 126. In one example, the worm wheel arrangement 126 may increase the output torque of the motor 120. The increased output torque transmitted to the motor shaft 122, causes the motor shaft 122 to rotate in a first direction.

When the motor shaft rotates from the first position to the second position along the first direction, the closing lever mounted on the motor shaft 122 may cause the closing connecting rod 220 to displace along a transverse axis. The closing connecting rod 220 in turn, displaces the first upper end fitting 204 from an initial position 620 to a final position 622 transversely, in order to energize the one or more springs 202 of the closing assembly 102. On energizing the closing assembly 102, the closing latch lever 150 mounted on the motor shaft 122 rotates simultaneously along with the motor shaft 122 and latches on to the closing latch unit 152. The latching mechanism holds the one or more springs 202a, 202b, and 202c in an energized state. On completion of charging of the closing assembly 102, i.e., when the closing latch lever is latched on to the closing latch unit 152, the rotation of the motor shaft 122 is arrested. The motor 120 may then be turned off by the limit switch.

During the charging operation, on supplying input power to the closing assembly 102, the worm wheel arrangement 126 of the charging assembly 106 is coupled to the motor shaft 122. The worm wheel arrangement 126 is coupled to the motor shaft 122 through the decoupling mechanism 128. Initially, to charge the closing assembly 102, the worm wheel arrangement 126 rotates the engagement disc 410 of the engagement mechanism 404. The engagement disc 410 may be rotated by 180 degrees from a start position to an end position along the first direction, in order to rotate the outer disc 402. The outer disc 402, in turn rotates the motor shaft 122 from the first position to the second position. Rotation of the motor shaft 122 from the first position to the second position in the first direction results in energization of the closing assembly 102 as explained above.

On energizing the closing assembly 102, i.e., at the end of the charging operation, the engagement plates are in an engaging arrangement with the engagement slots of the engagement disc. However, when the engagement mechanism rotates from the first position to the second position, on reaching the second position, the second plate of the engagement mechanism may be obstructed by the decoupling lever provided on the first housing plate of the worm wheel arrangement 126. The obstructing force exerted on the second plate may be transferred to the other engagement plates by causing the engagement plates to rotate about the axis of the one or more pins. The engagement plates are forced to rotate from the second position to the first position in a second direction. In one example, the second direction may be opposite to the first direction. The engagement plates disengage from the engagement slots, thereby disengaging the engagement mechanism from the outer disc. Therefore, the worm wheel arrangement 126 may be decoupled from the closing assembly 102. In one example, the worm wheel arrangement 126 may be decoupled from the closing assembly 102 to prevent transfer of torque from the worm wheel arrangement 126 to the closing assembly 102 to on energization of the closing assembly 102, i.e., during the charging operation.

Further, in order to electrically close the circuit breaker, the closing latch unit 152 of the drive unit 100 may receive a closing command signal. In one example, the closing command signal may be provided by a device connected to the electrical network, such as, an IED. In response to receiving the closing signal, the closing latch unit 152 may release the closing latch lever 150, causing the motor shaft 122 to rotate. During the closing operation, the motor shaft 122 rotates 180 degrees from the second position to the first position along the first direction in order to complete one revolution of 360 degrees, to de-energize or discharge the closing assembly 102.

When the motor shaft rotates from the second position to the first position, the closing lever rotates along with the motor shaft 122 to displace the closing connecting rod 220 transversely. The closing connecting rod 220 in turn, displaces the first upper end fitting 204 from the final position 622 to the initial position 620, in order to de-energize the closing assembly 102.

When the one or more springs 202 of the closing assembly 102 are de-energized or decompressed, a part of the energy released, alternatively referred to as the closing energy, is transmitted to the transmission assembly 108 and a part of the closing energy is transmitted to the opening assembly 104. When the motor shaft 122 rotates from the second position to the first position during de-energization of the closing assembly 102, the cam mounted on the motor shaft 122 rotates to hit the follower 134 mounted on the output shaft 124. The follower 134 may rotate in a first direction during the de-energization of the closing assembly 102. When the follower 134 rotates in the first direction, energy from the closing assembly 102 is transmitted to the transmission assembly 108 through the follower, to electrically close the circuit breaker.

Simultaneously, energy is also transmitted to the output shaft 124 coupled to the opening assembly (not shown in the figure), through the follower. The energy transmitted to the opening assembly is to energize the opening assembly 104. When the output shaft 124 rotates, the output lever mounted on the output shaft 124 displaces the opening connecting rod of the opening assembly transversely. The opening connecting rod may move the second upper end fitting from an initial position to a final position transversely, in order to energize the one or more springs of the opening assembly 104. While energizing the opening assembly 104, an opening latch lever mounted on the output shaft 124 rotates along with the output shaft 124 to latch onto the opening latch unit. The latching mechanism holds the one or more springs in an energized state.

Once the closing assembly is de-energized, the limit switch may send a trigger signal to the motor to start charging the one or more springs 202 of the closing assembly 102 for a subsequent closing operation. The discharging or de-energizing operation of the opening assembly is discussed with reference to FIG. 6(b).

Figure 6B:
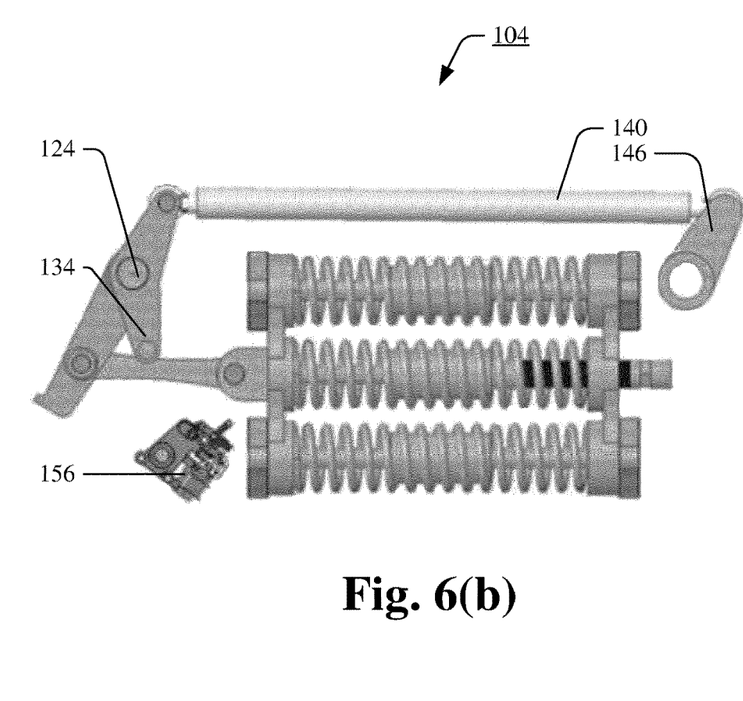
FIG. 6(b) illustrates a discharging operation of the opening assembly, in accordance with an embodiment of the present subject matter.

FIG. 6(b) illustrates a discharging operation of the opening assembly 104, in accordance with an embodiment of the present subject matter. In order to electrically open the circuit breaker, the opening latch unit 156 of the drive unit 100 may receive an opening command signal. In one example, the opening command signal may be provided by a device connected to the electrical network, such as, an IED. In response to receiving an opening signal to electrically open the circuit breaker, the opening latch unit 156 may release the opening latch lever to cause the output shaft 124 to rotate.

Rotation of the output shaft 124 causes the follower 134 of the cam-follower mechanism to rotate in a second direction during de-energization of the opening assembly 104. The follower 134 transfers the opening energy to the transmission rod 140 of the transmission assembly 108, which in turn is coupled to the mechanism housing lever 146 of the circuit breaker. Therefore, on de-energization of the opening assembly 104, the opening energy is transmitted from the opening assembly 104 to the transmission assembly 108 through the follower 134, to electrically open the circuit breaker.

FIG. 7 illustrates a second example perspective view of a high energy spring drive unit 700, in accordance with an embodiment of the present subject matter. The high energy spring drive unit 700, alternatively referred to as drive unit 700, may be connected in an electrical network (not shown in the figure) for controlling electrical switchgear, such as, a circuit breaker (not shown in the figure) for medium and high voltages. It will be understood that the electrical network may include a plurality of additional components or devices for monitoring, sensing, and controlling various parameters that may be associated with the network but are not shown for brevity. For example, components such as circuit breakers, sensors, current transformers, voltage transformers, loads connected to the transmission lines, shunt reactors, intelligent electronic devices IEDs, protective relays, and the like may be connected to the network.

In one example, the drive unit 700 may receive an opening command or a closing command to open or close the circuit breaker, respectively. In one example the opening command or the closing command may be issued by any device (not shown in the figure), such as an intelligent electronic device (IED). In other examples, the opening command or the closing command may be issued by any computing device, such as a server, a desktop device, a laptop, etc., which may receive the measurements from an IED.

In one example, the drive unit 700 includes a closing assembly 702, an opening assembly 704, a charging assembly 706, and a transmission assembly 708. In one example, the closing assembly 702 may be positioned at a first end 710 of the drive unit 700. Similarly, the opening assembly 704 may be positioned at a second end 712. The closing assembly 702 may be oriented along a first axis and the opening assembly 704 may be positioned substantially parallel to the closing assembly 702. In one example, the first axis may be a vertical axis. The closing assembly 702 and the opening assembly 704 may be provided with one or more springs to store energy required to electrically close or open the circuit breaker. The one or more springs of the drive unit 700 may be detachable and may be varied based on the output requirements of the drive unit 700. As it may be understood, the following is described with the closing assembly and opening assembly provided with two springs each. However, the closing and opening assemblies may be provided with a higher number of springs, based on the output energy required.

The closing assembly 702 includes one or more springs 711a and 711b, alternatively referred to as closing springs 711. The closing springs 711 are held between a first upper end fitting and a first lower end fitting. A closing connecting rod 720 of the closing assembly 702 may be coupled to the charging assembly 706, through a closing lever 722. In one example, the closing connecting rod 720 may be connected to the closing lever 722 at one end and the first lower end fitting at another end. In another example, the closing connecting rod 720 may be connected to the closing lever 722 at one end the first upper end fitting at another end. Based on the output energy required from the drive unit 700, the closing connecting rod 720 may be either connected to first upper end fitting or the first lower end fitting of the closing assembly 702. The closing lever 722 includes a first lever 722a and a second lever 722b. In one example, the first lever 722a may be coupled to a first portion 723a of a motor shaft of the charging assembly 706. The second lever 722b may be coupled to a second portion 723b of the motor shaft of the charging assembly. In one example, the closing connecting rod 720 may be connected in between the first lever 722a and the second lever 722b. The closing connecting rod 220 is to transmit motion and torque from the motor shaft to the one or more springs 711a and 711b and vice-versa, while energizing or de-energizing the closing assembly 702, respectively.

Similarly, the opening assembly 704 includes one or more springs 730a and 730b. The one or more springs 730a and 730b, alternatively referred to as opening springs may be held between a second upper end fitting and a second lower end fitting. In one example, an opening connecting rod 724 of the opening assembly 704 may be coupled to the output shaft 124 of the charging assembly 706. The opening connecting rod 724 may be coupled through an opening lever 726. The opening connecting rod 724 may be connected between the opening lever 726 at one end and the second upper end fitting 728 at another end. The opening connecting rod 724 is to transmit motion and torque from the output shaft 124 to the one or more springs 730a and 730b of the opening assembly 704 and vice versa, while charging and discharging the opening assembly, respectively.

The charging assembly 706 may be utilized to charge, alternatively referred to as energize, the one or more springs of the closing assembly 702. In one example, the charging assembly 706 may be disposed at a third end 714 in between the closing assembly 702 and the opening assembly 104. In one example, the third end 714 may be a top end of the drive unit 700, such that the top end of the drive unit 700 may be easily accessible for maintenance or repair.

As may be understood, the components of the closing assembly 702, the opening assembly 704, the charging assembly 706, and the transmission assembly 708 may be similar to the closing assembly 102, the opening assembly 104, the charging assembly 106, and the transmission assembly 108, respectively as described with reference to FIG. 1(*a*) and hence, are not shown for brevity.

For discussion, a method is described with reference to the implementations illustrated in FIG. 1(*a*) to operate a drive unit to electrically close or open a circuit breaker, in accordance with an embodiment of the present subject matter. The drive unit includes a closing assembly positioned at a first end of the drive unit, an opening assembly positioned at a second end of the drive unit substantially parallel to the closing assembly, a charging assembly positioned between the closing assembly and the opening assembly, and a transmission assembly coupled to the charging assembly. The method includes receiving a trigger signal from a limit switch to energize the closing assembly, receiving a closing signal to electrically close the circuit breaker, and receiving an opening signal to electrically open the circuit breaker.

In response to receiving the trigger signal from the limit switch to energize the closing assembly, input power may be supplied to the closing assembly through a worm wheel arrangement. The worm wheel arrangement may be coupled to a motor to transfer torque to a motor shaft to energize the closing assembly. On supplying input power to the closing assembly, the charging assembly may be decoupled through a decoupling mechanism. The charging assembly may be decoupled from the closing assembly to prevent transfer of torque from the worm wheel arrangement to the closing assembly on energization of the closing assembly. Further, a closing latch lever may be latched on to a closing latch unit of the charging assembly to lock the closing assembly in an energized state.

In response to receiving a closing signal to electrically close the circuit breaker, the closing latch lever may be released to rotate the motor shaft to de-energize the closing assembly. A cam of a cam-follower mechanism mounted on the motor shaft may be rotated to cause a follower of the cam-follower mechanism mounted on an output shaft to rotate in a first direction during de-energization of the closing assembly. When the follower rotates in the first direction, energy from the closing assembly is transmitted to the transmission assembly coupled to the follower to electrically close the circuit breaker. Simultaneously, energy is transmitted through the follower to the output shaft coupled to the opening assembly to energize the opening assembly. On energizing the opening assembly, an opening latch lever mounted on the output shaft may be latched on to an opening latch unit of the charging assembly to lock the opening assembly in an energized state.

Further, in response to receiving an opening signal to electrically open the circuit breaker, the opening latch lever may be released to cause the output shaft to cause the follower of the cam-follower mechanism to rotate in a second direction during de-energization of the opening assembly and transmit energy from the opening assembly to the transmission assembly coupled to the follower of the cam-follower mechanism when the follower rotates in the second direction to electrically open the circuit breaker.

Although the present subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter.

We claim:

1. A drive unit for operating a circuit breaker, the drive unit comprising:
    a closing assembly positioned at a first end of the drive unit for controlling closing of the circuit breaker;
    an opening assembly positioned at a second end of the drive unit, substantially parallel to the closing assembly, for controlling opening of the circuit breaker;
    a charging assembly positioned between the closing assembly and the opening assembly, the charging assembly comprising:
        a motor shaft coupled to the closing assembly and an output shaft coupled to the opening assembly;
        a worm wheel arrangement coupled to a motor to transfer torque to the motor shaft and the closing assembly to energize the closing assembly;
        a decoupling mechanism coupled to the worm wheel arrangement, wherein the decoupling mechanism is to decouple the worm wheel arrangement from the motor shaft to prevent transfer of torque from the worm wheel arrangement to the closing assembly on energization of the closing assembly; and
        a cam-follower mechanism comprising a cam mounted on the motor shaft and a follower mounted on the output shaft, wherein the cam is to cause the follower to rotate in a first direction during de-energization of the closing assembly to energize the opening assembly and the output shaft is to cause the follower to rotate in a second direction during de-energization of the opening assembly; and
    a transmission assembly actuated by the follower of the cam-follower mechanism, wherein the transmission assembly is to electrically close the circuit breaker when the follower rotates in the first direction and electrically open the circuit breaker when the follower rotates in the second direction.

2. The drive unit as claimed in claim 1, wherein the closing assembly comprises:
    one or more springs held between a first upper end fitting and a first lower end fitting, wherein the one or more springs are detachable and comprise a guiding element provided in a spring well of the one or more springs, wherein the guiding element is connected between a first upper mechanical stopper and a first lower mechanical stopper of the closing assembly and the guiding element comprises a protruded portion at a centre of the guiding element;
    a closing connecting rod connected between the first upper end fitting of the closing assembly at a distal end and a closing lever mounted on the motor shaft at a proximal end to transmit motion from the motor shaft to the one or more springs of the closing assembly; and
    a pre-compression nut provided on the first lower end fitting of the closing assembly, wherein the pre-compression nut is to rotate on application of an external force to increase or decrease an energy stored in the one or more springs of the closing assembly.

3. The drive unit as claimed in claim 1, wherein the opening assembly comprises:
    one or more springs held between a second upper end fitting and a second lower end fitting, wherein the one or more springs are detachable and comprise a guiding element provided in a spring well of the one or more springs, wherein the guiding element is connected between a second upper mechanical stopper and a second lower mechanical stopper of the opening assembly and the guiding element comprises a protruded portion at a centre of the guiding element;
    an opening connecting rod connected between the second upper end fitting of the opening assembly at a distal end and an opening lever mounted on the output shaft at a proximal end to transmit motion from the output shaft to the one or more springs of the opening assembly; and
    a pre-compression nut provided on the second lower end fitting of the opening assembly, wherein the pre-compression nut is to rotate on application of an external force to increase or decrease an energy stored in the one or more springs of the opening assembly.

4. The drive unit as claimed in claim 1, wherein the charging assembly comprises:
    a closing latch mechanism comprising a closing latch lever and a closing latch unit, wherein the closing latch lever is mounted on the motor shaft and is to latch onto the closing latch unit to lock the closing assembly in an energized state; and
    a closing damper coupled to the closing assembly to dissipate excess energy at an end of a closing operation.

5. The drive unit as claimed in claim 1, wherein the charging assembly comprises:
    an opening latch mechanism comprising an opening latch lever and an opening latch unit, wherein the opening latch lever is mounted on the output shaft and is to latch onto the opening latch unit to lock the opening assembly in an energized state; and
    an opening damper coupled to the opening assembly to dissipate excess energy at an end of an opening operation.

6. The drive unit as claimed in claim 1, wherein the decoupling mechanism comprises:
    an outer disc comprising an opening provided with a plurality of ridges along an inner periphery of the opening to receive the motor shaft; and
    an engagement mechanism free to rotate about an axis of the motor shaft coupled to the outer disc, wherein the engagement mechanism is to engage or disengage with the outer disc to couple or decouple the worm wheel arrangement from the motor shaft.

7. The drive unit as claimed in claim 6, wherein the engagement mechanism comprises:
    an engagement disc comprising an aperture provided at a centre of the engagement disc to allow the motor shaft to pass through; and one or more engagement slots provided along a circumference of the engagement disc to engage or disengage with one or more first plates and a second plate, wherein the one or more first plates and the second plate are mounted on the outer disc with one or more pins; and wherein the one or more first plates and the second plate are free to rotate about an axis of the one or more pins to engage or disengage with the engagement disc at a first end.

8. The drive unit as claimed in claim 7, wherein the second plate comprises a protrusion at a second end.

9. The drive unit as claimed in claim 7, wherein the engagement mechanism comprises:
one or more link arms to connect a second end of the one or more first plates and the second plate, wherein the one or more link arms are to transfer motion from one plate to another plate; and
a tension spring connected between a first pin of the one or more pins mounted on a first plate of the one or more first plates and the second plate to engage the one or more first plates and the second plate to the engagement disc.

10. The drive unit as claimed in claim 1, wherein the charging assembly comprises:
a decoupling lever provided on a first portion of a housing plate of the worm wheel arrangement projecting outwards substantially perpendicular to the housing plate, wherein the decoupling lever is to restrict a movement of the decoupling mechanism.

11. The drive unit as claimed in claim 1, wherein the transmission assembly comprises:
an output lever coupled to the follower of the cam-follower mechanism of the charging assembly at one end and to a transmission rod at another end, wherein the output lever is to transmit energy from the follower to the transmission rod,
wherein the transmission rod is coupled to a mechanism housing lever to transmit energy to the mechanism housing lever to electrically close or open the circuit breaker.

12. The drive unit as claimed in claim 11, wherein a length of the transmission rod is variable to vary an output characteristic of the drive unit.

13. The drive unit as claimed in claim 1, wherein the charging assembly is positioned at a third end for ease of accessibility.

14. A method for operating a drive unit to electrically close or open a circuit breaker, wherein the drive unit comprises a closing assembly positioned at a first end of the drive unit, an opening assembly positioned at a second end of the drive unit substantially parallel to the closing assembly, a charging assembly positioned between the closing assembly and the opening assembly, and a transmission assembly coupled to the charging assembly, the method comprising:
receiving a trigger from a limit switch to energize the closing assembly and in response to receiving the trigger:
supplying input power to the closing assembly through a worm wheel arrangement coupled to a motor to transfer torque to a motor shaft to energize the closing assembly;
decoupling the charging assembly through a decoupling mechanism from the closing assembly to prevent transfer of torque from the closing assembly to the worm wheel arrangement on de-energization of the closing assembly; and
latching a closing latch lever to a closing latch unit of the charging assembly to lock the closing assembly in an energized state;
receiving a closing signal to electrically close the circuit breaker and in response to receiving the closing signal:
releasing the closing latch lever to rotate the motor shaft to de-energize the closing assembly;
rotating a cam of a cam-follower mechanism mounted on the motor shaft to cause a follower of the cam-follower mechanism mounted on an output shaft to rotate in a first direction during de-energization of the closing assembly;
transmitting energy from the closing assembly to the transmission assembly coupled to the follower when the follower rotates in the first direction to electrically close the circuit breaker;
transmitting energy through the follower to the output shaft coupled to the opening assembly to energize the opening assembly; and
latching an opening latch lever mounted on the output shaft to an opening latch unit of the charging assembly to lock the opening assembly in an energized state;
receiving an opening signal to electrically open the circuit breaker and in response to receiving the opening signal:
releasing the opening latch lever to cause the output shaft to cause the follower of the cam-follower mechanism to rotate in a second direction during de-energization of the opening assembly; and
transmitting energy from the opening assembly to the transmission assembly coupled to the follower of the cam-follower mechanism when the follower rotates in the second direction to electrically open the circuit breaker.

* * * * *